V. Doane, Jr.,
Cutting Fish for Bait.
N° 83,048.  Patented Oct. 13, 1868.
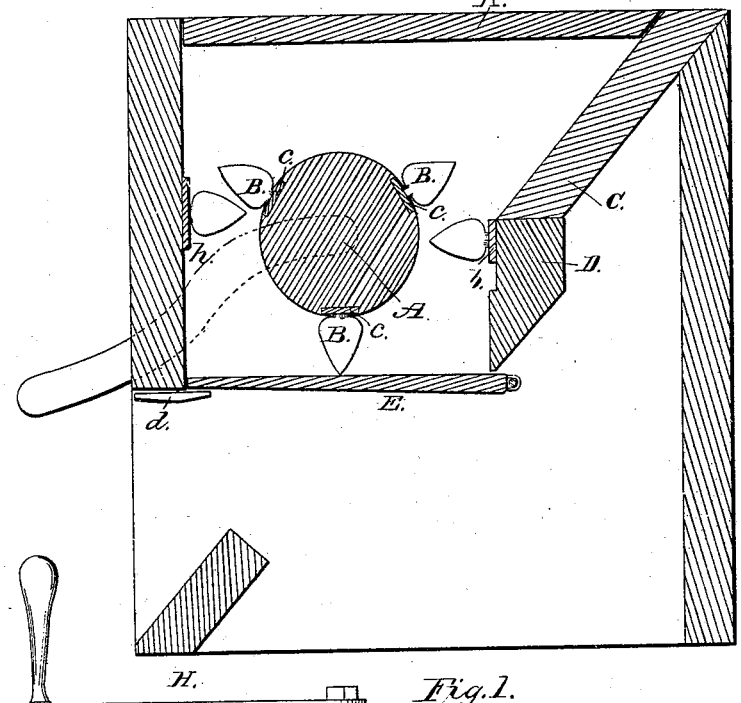
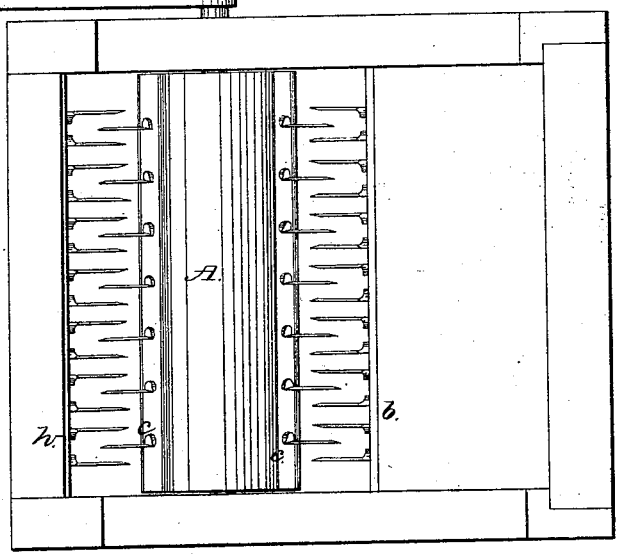
Witnesses:  Inventor:
J. H. Smith  Valentine Doane Jr
N. P. Chipman  Chipman Hosmer & Co
  attys

United States Patent Office.

VALENTINE DOANE, JR., OF HARWICH PORT, MASSACHUSETTS.

Letters Patent No. 83,048, dated October 13, 1868.

IMPROVED FISH-BAIT CUTTER.

The Schedule referred to in these Letters Patent and making part of the same.

*To all whom it may concern:*

Be it known that I, VALENTINE DOANE, Jr., of Harwich Port, in the county of Barnstable, and State of Massachusetts, have invented a new and valuable Improvement in Mills for Cutting Fish-Bait; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my bait-mill with the cover removed, and Figure 2 is a sectional view of said mill.

The object of my invention is to provide means for fishermen, by which fish-bait can be cut into suitable pieces with greater dispatch and certainty than by any means heretofore known or used.

It is well known that men who fish for mackerel are obliged, in order to insure success, to prepare, and cast upon the surface of the water, bait cut or ground into pieces adapted to the swallowing-capacities of those fish. The bait commonly used is fish of the alewife or menhaden species. The bait thus cast upon the water attracts schools of mackerel, and enables the fishermen to secure them in large quantities.

The letter A of the drawings is a representation of a cylinder, adjusted, by suitable gudgeons, in bearings set in the side of the mill-box. Letters c are strips of iron or iron plates, placed longitudinally in the periphery of the cylinder. Letters B are sharp knives attached to the plates c, in the manner represented.

Inside the mill-box, and extending downward in a diagonal direction, in the manner shown, is the plank C. Letter D is a block, adjusted in the manner shown, and letter E is a hinged bottom, secured by a catch or button, d. This plank, block, and bottom, together with the front side of the mill-box, form an inner box in which the cylinder revolves.

On the side of block D, and in a plate, f, adjusted therein, as shown, I adjust a series of knives corresponding in size and shape with the knives on cylinder A, and arrange them in such manner that said cylinder-knives shall pass through the interstices thereof. I usually place twice the number of knives on the plate that I attach to the cylinder. This method of adjustment is shown on fig. 2.

Inside the front side of the mill-box, and immediately opposite the plate f, I affix another plate and series of knives, corresponding in all respects to plate f, and the knives thereon. This last-named plate is marked h on the drawings.

Letter H is a crank by which the cylinder A is actuated, and letter K is a cover.

My device is operated as follows, to wit:

The operator places the bait to be cut in the box, over cylinder A, and, after closing the cover, turns the crank around and around until the same is cut to his satisfaction. He then releases the bottom from its fastening d, and the bait falls into a vessel ready for use.

What I claim as my invention, and desire to secure by Letters Patent, is—

A mill for cutting fish-bait, having cylinder A, plates f and h, and the series of knives connected therewith, as described and shown; plank C, block D, bottom E, and cover K, constructed and arranged substantially as specified.

In testimony that I claim the above, I have hereunto subscribed my name in the presence of two witnesses.

VALENTINE DOANE, Jr.

Witnesses:
ENOS R. KELLEY,
THOMAS W. TAYLOR.